United States Patent

[11] 3,585,812

| [72] | Inventor | Louis W. Parker |
| | | Parker Electronics Inc., 2040 N. Dixie Hwy., Fort Lauderdale, Fla. 33305 |
| [21] | Appl. No. | 6,178 |
| [22] | Filed | Jan. 27, 1970 |
| [45] | Patented | June 22, 1971 |

[54] VEHICLE AIR CONDITIONING SYSTEM
10 Claims, 2 Drawing Figs.

[52] U.S. Cl. ........................................... 62/180,
  62/186, 62/244, 62/406, 62/430
[51] Int. Cl. ......................................... F25d 17/00
[50] Field of Search .................................. 62/180,
  186, 244, 259RC, 406

[56] References Cited
UNITED STATES PATENTS

| 2,032,572 | 3/1936 | Haumers ........................ | 62/259 X |
| 2,151,097 | 3/1939 | Germouprez ................... | 62/259 X |
| 2,162,538 | 6/1939 | Peo ............................... | 62/259 X |

*Primary Examiner*—William J. Wye
*Attorneys*—William D. Hall, Elliott I. Pollock, Fred C. Philpitt, George Vande Sande, Charles F. Steininger and Robert R. Priddy ABSTRACT: An expansible enclosure, containing a freezable liquid, is disposed across the exterior metal top of a vehicle. Freon lines extend from a conventional air conditioning unit, located within the vehicle, through the freezable liquid for freezing the liquid within said container during operation of said unit. An automatic control system controls freon flow through the conventional air conditioning unit and through said freezable liquid, and also controls operation of a fan motor associated with the conventional unit and a blower unit associated with the freezable liquid portion of the system.

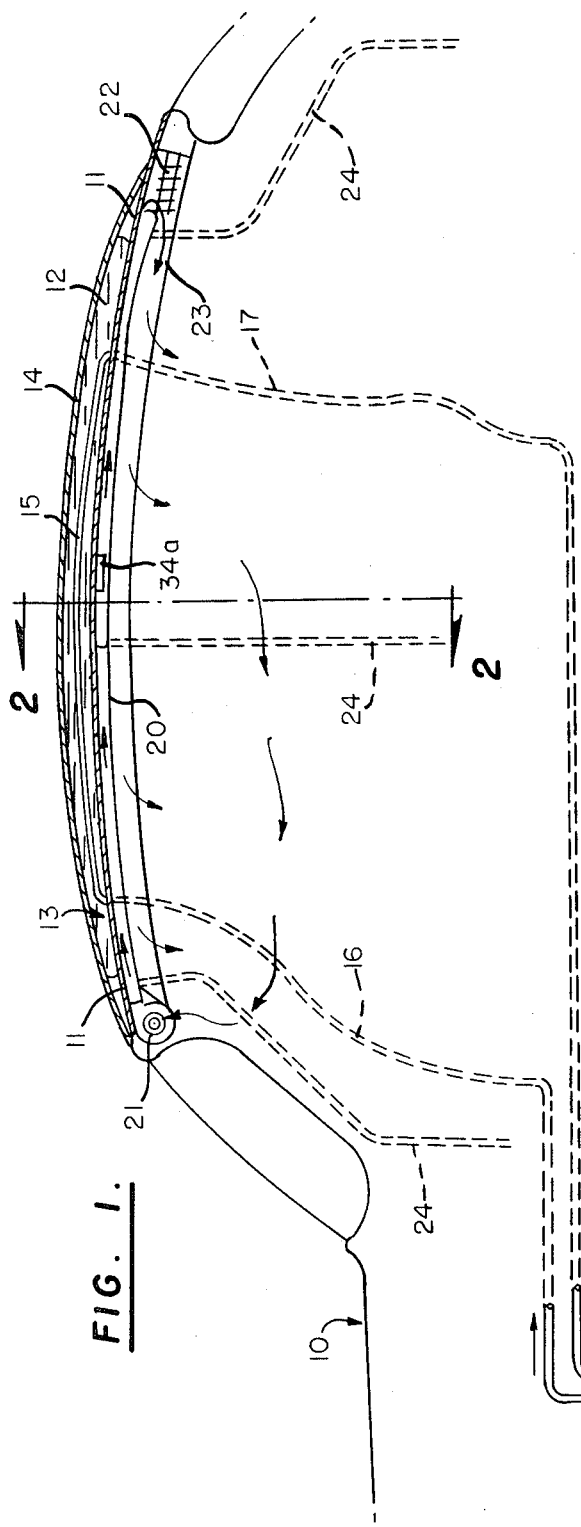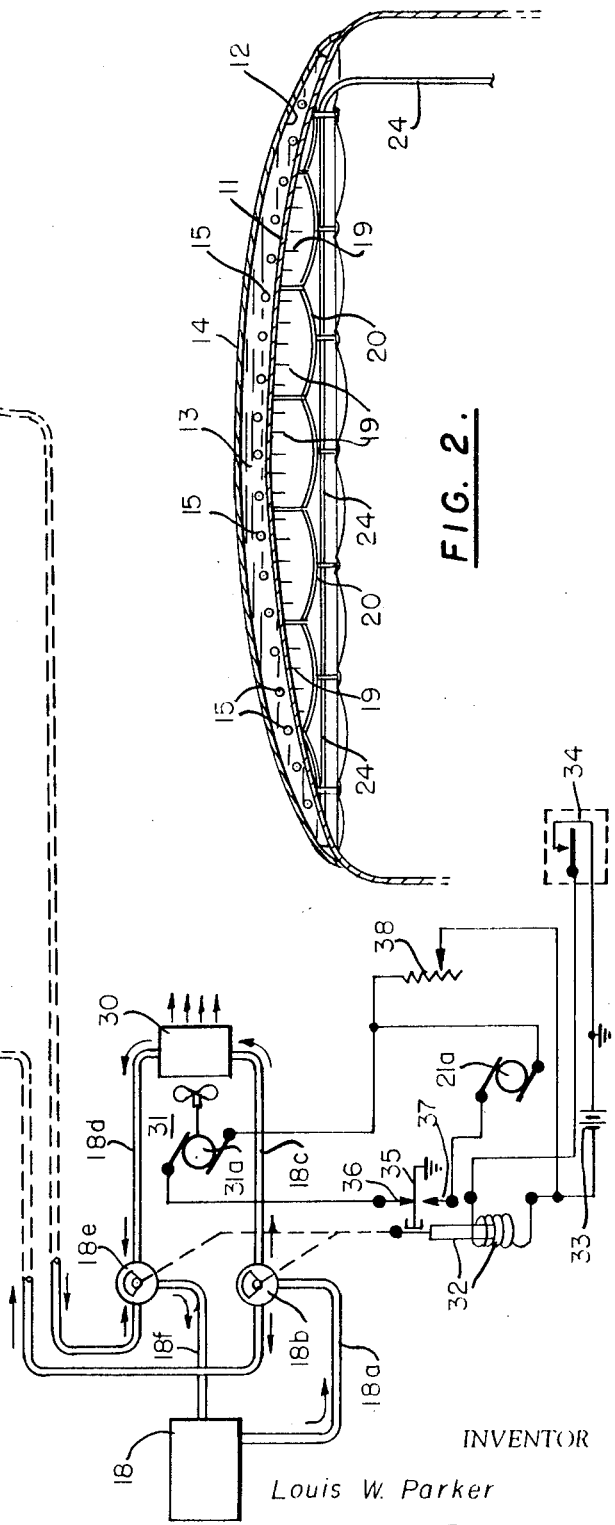
INVENTOR
Louis W. Parker

VEHICLE AIR CONDITIONING SYSTEM

BACKGROUND OF THE INVENTION

Various forms of automobile air conditioning units have been suggested heretofore. Some known units effect vehicle air cooling by circulating a refrigerant such as freon, and by causing the freon to pass between gaseous and liquid states in accordance with known refrigeration cycles. Such units, while effective to achieve air cooling, operate efficiently only when the automobile engine is actually running; and, as a result, units of the type described cannot be employed to achieve air cooling when the vehicle is parked with its engine off.

Other types of air conditioning units have been suggested heretofore wherein a refrigerant is caused to pass through a freezable liquid to freeze such a liquid, with an air blower being employed to pass air over the frozen liquid for cooling purposes. Such systems, and suggestions regarding their incorporation in a vehicle, appear in references such as Heideman U.S. Pat. No. 2,013,848 and Parker U.S. Pat. No. 2,957,317. Systems of this type, when incorporated in a vehicle, have the advantage that, once the freezable liquid is frozen, air cooling can be accomplished on the interior of the vehicle even though the vehicle is parked with its engine off, simply by causing a blower to pass air over the previously frozen liquid.

The Heideman and Parker systems identified above contemplate that the freezable liquid portion of the system be located entirely within the confines of the automotive vehicle. Such arrangements exhibit major disadvantages in that they result in a significant reduction in the passenger space available within the vehicle, particularly since they require special suspension arrangements located within the vehicle for supporting the freezable liquid container in place. This problem is aggravated by the fact that the prior systems mentioned employ strong rigid containers for the freezable liquid, and the fixed dimensions of those containers must accordingly be made sufficiently large to accommodate expansion of the liquid during its freezing. There is also the danger of the large amount of liquid spilling inside the vehicle in case of some defect developing on the container or in case of accident. Moreover, the actual cooling function accomplished by these prior systems is somewhat erratic due to the forms of control employed.

The present invention is intended to obviate all of these difficulties.

SUMMARY OF THE INVENTION

In accordance with the present invention, an automotive air conditioning system is provided which comprises a conventional air conditioning unit located within the vehicle, e.g., within the motor compartment as is conventional, and which further comprises an expansible liquid-containing unit cemented or otherwise fastened to the exterior of the vehicle. In a preferred system, to be described, the expansible container comprises a bag fabricated of a flexible material such as plastic or rubber, and it contains a freezable liquid such as water. Other freezable liquids may be employed, however, and it must therefore be understood that the word "water" used hereinafter is intended to be generic to all such freezable liquids, and that the term "ice" used hereinafter is intended to be generic to the frozen state of such liquids.

The flexible water-containing bag forming a portion of the system is preferably mounted above the metal top of the vehicle, and conforms in shape thereto. This arrangement takes good advantage of the strength of the metal vehicle top for support of the bag; keeps the large amount of water within the bag at a location outside of the vehicle so as to prevent seepage or flooding within the vehicle; assures that the passenger compartment space is not diminished due to the water-containing bag portion of the system; uses the heat conductivity of the metal top itself to conduct heat away from the inside of the car; and uses the metal top of the car as an extended cooling surface which is maintained at a constant temperature and which efficiently cools all portions of the passenger compartment. On the interior of the car, below the location of the water bag, a relatively shallow separator is mounted to collect and drain away any moisture condensation, and to form an air duct for the passage of circulating air throughout the interior of the passenger compartment. The provision of this separator, and blower and heater units associated therewith, does not effect any significant reduction in the available passenger compartment space.

Freon lines extend from the conventional air conditioning unit to a radiator forming a portion of that unit, and also extend through the freezable liquid in the aforementioned flexible bag on the exterior of the vehicle. Thermostatically operated controls govern the freon circulation, as well as fan and blower motors forming portions of the overall system. When the system is first put into operation, and the water in the aforementioned bag is not yet frozen, the controls direct a portion of the freon flow through the conventional air conditioning unit radiator to achieve immediate cooling of the vehicle passenger compartment, and simultaneously direct another portion of the freon through the freezable liquid. As the system continues its operation, the water in the external compartment is reduced in temperature and eventually becomes frozen. The temperature of the car top is sensed thermostatically and, when it is sufficiently low, the freon circulation is diverted so that it no longer passes through the conventional air conditioning unit radiator and passes entirely through the external bag. At the same time, the fan motor in the conventional unit is automatically turned off, while the blower motor associated with the aforementioned interior duct is automatically turned on.

As the system continues to operate, cooling is achieved entirely by causing air to flow past the under surface of the automobile metal top which acts as a cooling surface maintained at substantially 32° F. by the frozen water in the exterior bag; and the ice in said external bag acts as an intermediary between the circulating freon and the cooling surface to achieve constant cooling notwithstanding variations in speed of the refrigerator compressor due to variations in speed of the vehicle. Moreover, even after the vehicle is parked and its motor turned off, the ice in the external bag acts as a cooling reservoir so that the interior of the car remains cool for a subsequent time period.

BRIEF DESCRIPTION OF THE DRAWINGS

FIG. 1 is a diagrammatic cross-sectional view of an automobile incorporating the present invention, including the control system employed; and FIG. 2 is a cross section of a portion of the system taken on line 2-2 of FIG. 1.

DESCRIPTION OF THE PREFERRED EMBODIMENT

In accordance with the present invention, a conventional automobile 10 is provided with a metal top 11 covering the passenger compartment. Car top 11 is in turn covered by a resilient bag 12 attached thereto, fabricated for example of a rubber or plastic material, and having its under surface supported by and conforming in shape to the curved metal top 11. Bag 12 is filled with a freezable liquid 13 such as water, and the bag structure is in turn completely covered by a layer 14 of insulating material. Material 14 may be made of several sheets, so as to have some rigidity as well as insulating properties.

In addition to water 13, bag 12 contains an array of tubing 15 fabricated of metal or plastic and laid throughout the interior of bag 12 in a continuous zigzag pattern. Tubing array 15, in conjunction with bag 12 and water 13, acts as an evaporator cooler for freon, or any other appropriate refrigerant, which enters tubing 15 in liquid form and leaves as a gas. One end of the tubing array 15 is connected to an inlet tube 16 which passes through a wall of bag 12 and through appropriate structural portions of automobile 10 to a conventional air conditioning unit 18 which may be located, for example, in the engine compartment of automobile 10. The opposing end of array 15 is similarly connected to air conditioning unit 18 by means of an outlet tube 17 similarly disposed within the structural confines of automobile 10. The actual interconnections of tubes 16 and 17 to unit 18, and the construction of unit 18 itself and its controls, will be discussed in further detail subsequently. In general, however, passage of refrigerant from unit 18 via tube 16 to array 15 and thence via tube 17 back to unit 18 operates to freeze the water 13 in bag 12 so as to convert the preexisting metal top 11 of automobile 10 into an extended cooling surface overlying the passenger compartment of said automobile.

The underside of metal car top 11, as shown on FIG. 2, is equipped with a plurality of fins 19 to increase the radiating surface of said top 11. A ribbed separator 20, fabricated of plastic or metal, is mounted below fins 19. Separator 20 performs two functions, i.e., it forms a duct below car top 11 through which air may pass during operation of the system, and, in addition, it operates to collect any moisture which may condense on the under side of car top 11 or on fins 19 during passage of air through said duct. Air is impelled through the duct between the bottom of metal car top 11 and separator 20 from an air blower 21 which receives air from the interior of the car.

The air blown between car top 11 and separator 20 passes through the full length of the aforementioned duct to a heater 22 where the air is moderately heated and its relative humidity decreased below the dew point. After this, the air reverses direction (as depicted in FIG. 1) and passes through the space between the underside of separator 20 and the cloth ceiling 23 of the car. Cloth ceiling 23 is porous and permits the circulating air to diffuse into the passenger compartment of the automobile and then to be circulated back through the paths described by means of blower 21. Any moisture which collects in separator 20 during the aforementioned operation can be drained to the exterior of the car by means of an appropriate system of drainpipes 24. Any suitable drainage arrangement can be employed.

Inasmuch as it may take a considerable period of time to freeze water 13 in icebag 12, cooling of the car would be delayed after the start of the automobile engine if this liquid freezing alone were employed to effect air cooling. To overcome this delay, a conventional automobile evaporator cooler 30 cooperating with a fan 31 driven by fan motor 31a, and forming a portion of the aforementioned conventional air conditioning unit 18, is provided. Unit 18 and its associated elements is, however, modified so as to utilize evaporator 30 for cooling purposes only during the time that the water in bag 12 is being cooled; and once the temperature of said water has been sufficiently lowered, the cooling operation is assumed entirely by bag 12 and its associated elements.

More particularly, the compressor (not shown) in air conditioning unit 18 is connected to an outlet freon line 18a which is in turn connected, via a valve 18b, to line 18c coupled to evaporator 30, as well as via the aforementioned tube 16 to tubing array 15 in bag 12. Outlet line 17 from bag 12, along with outlet line 18d from evaporator 30, is connected via a further valve 18e to a return line 18f. The position of valves 18b and 18e is controlled by a solenoid 32 the coil of which is selectively energized from source 33 under the control of a thermostat 34. Thermostat 34 is positioned directly below metal top 11, in the aforementioned duct, at the position designated 34a in FIG. 1.

The actual position of the valves 18b and 18e shown in FIG. 1 corresponds to the conditions existing when the equipment commences operation. More particularly, at this time the water 13 in bag 12 is not frozen, the temperature of metal top 11 is appreciably above 32° F., and thermostatic switch 34 is open so that source 33 (comprising the conventional automobile battery and/or generator system) does not energize solenoid 32. Operation of the automobile engine drives the compressor in unit 18 to pump freon via line 18a to valve 18b where the freon flow divides so as to pass to conventional evaporator 30 as well as to the tubing array 15 in bag 12; and the return flow of freon via tubes 17 and 18d combines at valve 18e to return to unit 18.

The plunger of solenoid 32 is mechanically connected to a grounded switch blade 35 movable, in response to actuation of solenoid 32, between fixed contacts 36 and 37. Contact 36 is normally in engagement with switch blade 35 when solenoid 32 is not energized. Contact 35—36 is broken, and switch blade 35 engages contact 37, when solenoid 32 is energized through the action of thermostat 34. Contact 36 is connected as shown to one side of motor 31a of the air conditioning unit fan 31; and the other side of fan motor 31a is connected via a rheostat 38 to one side of energization source 33, the other side of which source is also grounded as illustrated. Normally open contact 37 is connected to one side of motor 21a, constituting the motor of blower 21 described earlier; and the other side of blower motor 21a is also connected via the aforementioned rheostat 38 to energization source 33.

For the condition of operation illustrated in FIG. 1, i.e., solenoid 32 is not energized, freon flows to both conventional evaporator 30 and to the auxiliary evaporator formed by tubing array 15. At the same time, fan motor 31a is energized but blower motor 21a is not energized. Accordingly, for this condition of operation, the water 13 in bag 12 is cooled toward its freezing point, but no air is being impelled by blower 21 past the underside of metal top 11. Immediate cooling of the passenger compartment is obtained by fan motor 31 impelling air past evaporator 30 to the interior of the passenger compartment. During this condition of operation, fan motor 31 may, if desired, be turned off or otherwise regulated in speed by rheostat 38.

The operating condition described above continues until the temperature of the water 13 in bag 12 is reduced sufficiently to permit the automobile air cooling function to be assumed by the car-top portion of the system. When this temperature is achieved, it is detected by thermostat 34 located at 34a, and thermostat 34 then closes to connect energization source 33 across the coil of solenoid 32 to energize said solenoid. Energization of solenoid 32 moves valves 18b and 18e to close off lines 18c and 18d whereby freon no longer passes through evaporator 30 and passes entirely through the auxiliary evaporator comprised by tubing network 15. At this same time, energization of solenoid 32 breaks contact 35—36 so as to deenergize fan motor 31a, and completes contact 35—37 so as to energize blower motor 21a. Air is now impelled through the duct below the cooling surface provided by car top 11 in the manner already described; and the blower motor 21a may, as in the case of fan motor 31a, be turned off or otherwise regulated by rheostat 38.

Freon continues to flow through tubing array 15 so as to freeze water 13 solid if it has not already been so frozen; and cooling now occurs over the entire top of the passenger compartment so long as the automobile engine continues running. Moreover, when the engine is stopped, and freon is no longer circulated through ice bag 12, the passenger compartment will nevertheless remain cool for a substantial additional period of time due to the fact that the ice in bag 12 acts as cooling reservoir. After the freezing process has been completed, the freon compressor is stopped by the conventional low pressure switch in the freon line. Following this, the compressor starts and stops as demanded by the cooling load.

It will be appreciated that, by disposing ice bag 12 completely across the exterior metal top 11, ice bag 12 is supported in an excellent fashion and does not diminish the head room of the passenger compartment. In addition to providing the desired support function, car top 11 acts as an extended cooling surface which conducts heat away from the interior of the automobile and which provides efficient, draftless cooling over all portions of the passenger compartment, including the rear seat area thereof which is often badly cooled by conventional systems. Moreover, since the freezing of water 13 in bag 12 functions to provide a layer of ice as an intermediary between the freon in tubing 15 and the cooling surface 11, the cooling surface remains at substantially the same temperature (substantially 32° F.) regardless of variations in speed of the refrigerator compressor due to variations in engine speed.

While I have thus described a preferred embodiment of the present invention, many variations will be suggested to those skilled in the art. It must therefore be emphasized that the foregoing description is intended to be illustrative only and not limitative of my invention; and all such variations and modifications as are in accord with the principles described are meant to fall within the scope of the appended claims.

Having thus described my invention, I claim:

1. An air conditioning system for use in a vehicle having a passenger compartment bounded in part by an extended structural surface comprising a portion of the body of said vehicle, said system including a liquidtight container having flexible walls, said container being fastened to and supported by the exterior side of said structural surface adjacent to said passenger compartment, the wall of said container which is in abutment with said exterior side conforming in shape to the shape of said structural surface, a freezable liquid in said container, tubing means within said container immersed in said freezable liquid and positionally spaced from the exterior side of said structural surface, means for circulating a refrigerant through said tubing means to cool said liquid toward its freezing point thereby to lower the temperature of said structural surface causing it to act as an extended cooling surface, and means for circulating air along the interior side of said structural surface and through said passenger compartment.

2. The system of claim 1 wherein said structural surface comprises the metal top overlying the passenger compartment of said vehicle.

3. The system of claim 2 including fins extending from the interior side of said metal top for increasing the effective radiating area of said interior side.

4. The system of claim 2 including means defining an air duct directly below the interior side of said metal top, said means for circulating air including blower means for forcing air through said duct and past the interior side of said metal top.

5. The system of claim 4 including a surface of porous material below said duct forming the interior ceiling of said passenger compartment, said circulating means causing air from said duct to diffuse through said porous material.

6. The system of claim 1 wherein all the walls of said container are fabricated of a flexible material.

7. The system of claim 1 including a layer of insulating material overlying said container, said insulating layer extending into engagement with the exterior side of said structural surface and forming a rigid top covering said container.

8. The system of claim 1 including a refrigerant evaporator unit directly communicating with the passenger compartment of said vehicle, said circulating means including means for simultaneously circulating refrigerant through both said evaporator unit and through the tubing means in said container, and control means for interrupting the flow of refrigerant through said evaporator unit thereby to cause said refrigerant to circulate through said tubing means only.

9. The system of claim 8 wherein said control means includes thermostat means responsive to the temperature adjacent the interior side of said structural surface, and electrically operable valve means responsive to said thermostat means for controlling the flow of said refrigerant.

10. The system of claim 9 wherein said circulating means includes an electrically energizable blower, said evaporator unit including an electrically energizable fan, and circuit means coupled to said thermostat means for controlling the energization of said blower and fan in dependence upon the temperature adjacent the interior side of said structural surface.